(12) United States Patent
Kwak

(10) Patent No.: US 12,442,300 B2
(45) Date of Patent: Oct. 14, 2025

(54) TIE ROD-LOCKING NUT ASSEMBLY AND GAS TURBINE INCLUDING SAME

(71) Applicant: DOOSAN ENERBILITY CO., LTD., Changwon (KR)

(72) Inventor: Young Seob Kwak, Changwon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 154 days.

(21) Appl. No.: 18/517,568

(22) Filed: Nov. 22, 2023

(65) Prior Publication Data

US 2024/0254880 A1 Aug. 1, 2024

(30) Foreign Application Priority Data

Jan. 31, 2023 (KR) .................. 10-2023-0012528

(51) Int. Cl.
| | |
|---|---|
| F01D 5/02 | (2006.01) |
| F01D 5/06 | (2006.01) |
| F01D 25/28 | (2006.01) |
| F02C 3/04 | (2006.01) |
| F16B 31/04 | (2006.01) |

(Continued)

(52) U.S. Cl.
CPC ............ *F01D 5/025* (2013.01); *F01D 5/026* (2013.01); *F01D 5/066* (2013.01); *F01D 25/28* (2013.01); *F16B 31/04* (2013.01); *F16B 37/145* (2013.01); *F16B 39/10* (2013.01); *F16B 39/101* (2013.01); *F16B 39/24* (2013.01); *F16D 1/0876* (2013.01); *F02C 3/04* (2013.01); *F05D 2220/32* (2013.01); *F05D 2240/24* (2013.01);

(Continued)

(58) Field of Classification Search
CPC .......... F01D 5/025; F01D 5/026; F01D 5/066; F01D 25/28; F02C 3/04; F16B 31/04; F16B 37/145; F16B 39/10; F16B 39/101; F16B 39/24; F16D 1/0876; F05D 2220/32; F05D 2240/24; F05D 2240/35; F05D 2250/131; F05D 2250/132; F05D 2260/31
USPC ........................................................ 403/306
See application file for complete search history.

(56) References Cited

U.S. PATENT DOCUMENTS 3,070,348 A * 12/1962 Vogel ...................... F01D 5/066
 416/198 A
3,618,994 A * 11/1971 Gepfert .................... F16D 1/06
 403/103

(Continued)

FOREIGN PATENT DOCUMENTS

| CN | 110374692 A | 10/2019 |
|---|---|---|
| CN | 210565555 U | 5/2020 |

(Continued)

OTHER PUBLICATIONS

Notice of Allowance from Korean Patent Office, dated Jan. 20, 2025.
EP EESR dated Jun. 14, 2024.

*Primary Examiner* — Jason H Duger
(74) *Attorney, Agent, or Firm* — Harvest IP Law, LLP

(57) ABSTRACT

A tie rod-locking nut assembly includes a tie rod-locking nut threaded onto a jack bolt, a jack bolt-locking nut inserted between the tie rod-locking nut and the jack bolt, an anti-loosening washer formed to wrap around an outer circumferential surface of the jack bolt-locking nut to prevent loosening of the jack bolt-locking nut, and a locking plate (Continued)

formed to cover the anti-loosening washer and engaging with an outer circumferential surface of the tie rod.

20 Claims, 10 Drawing Sheets

(51) Int. Cl.
  *F16B 37/14* (2006.01)
  *F16B 39/10* (2006.01)
  *F16B 39/24* (2006.01)
  *F16D 1/08* (2006.01)

(52) U.S. Cl.
  CPC .... *F05D 2240/35* (2013.01); *F05D 2250/131* (2013.01); *F05D 2250/132* (2013.01); *F05D 2260/31* (2013.01)

(56) References Cited

U.S. PATENT DOCUMENTS

| | | | | |
|---|---|---|---|---|
| 4,540,199 | A * | 9/1985 | Neill | B25B 27/16 |
| | | | | 29/256 |
| 4,622,730 | A * | 11/1986 | Steinbock | B21B 27/035 |
| | | | | 470/57 |
| 4,671,324 | A * | 6/1987 | Neill | B25B 27/16 |
| | | | | 138/44 |
| 5,069,587 | A * | 12/1991 | Levenstein | F16D 1/06 |
| | | | | 411/917 |
| 5,257,905 | A * | 11/1993 | Wynn | F01D 5/026 |
| | | | | 415/232 |
| 5,735,655 | A * | 4/1998 | Callan | F16B 39/12 |
| | | | | 411/291 |
| 10,487,838 | B2 * | 11/2019 | Pruitt | F04D 25/024 |
| 12,331,651 | B2 * | 6/2025 | Bisson | F01D 5/066 |
| 2006/0013693 | A1 * | 1/2006 | Meacham | F01D 5/066 |
| | | | | 416/244 R |
| 2015/0219121 | A1 | 8/2015 | King | |
| 2017/0051611 | A1 * | 2/2017 | Hofsommer | F01D 5/026 |
| 2018/0187711 | A1 | 7/2018 | Rao | |
| 2020/0256256 | A1 * | 8/2020 | Jiang | F16D 1/10 |

FOREIGN PATENT DOCUMENTS

| | | |
|---|---|---|
| CN | 114810997 A | 7/2022 |
| JP | 1999117340 A | 4/1999 |
| JP | 4562500 B2 | 10/2010 |
| JP | 4778892 B2 | 9/2011 |
| JP | 5989615 B2 | 9/2016 |
| JP | 2021-060064 A | 4/2021 |
| KR | 10-1667939 B1 | 10/2016 |
| KR | 10-1834647 B1 | 4/2018 |
| KR | 10-1943749 B1 | 1/2019 |
| KR | 10-2268979 B1 | 6/2021 |
| KR | 10-2294821 B1 | 8/2021 |
| KR | 10-2325100 B1 | 11/2021 |
| KR | 10-2367002 B1 | 2/2022 |

\* cited by examiner

TIE ROD-LOCKING NUT ASSEMBLY AND GAS TURBINE INCLUDING SAME

CROSS REFERENCE TO RELATED APPLICATION

The present application claims priority to Korean Patent Application No. 10-2023-0012528, filed on Jan. 31, 2023, the entire contents of which are incorporated herein for all purposes by this reference.

BACKGROUND

1. Technical Field

The present disclosure relates to a tie rod-locking nut assembly and a gas turbine including the same.

2. Description of the Background Art

The turbine is a mechanical device that obtains a rotational force by an impulsive force or reaction force using a flow of a compressible fluid such as steam or gas. The turbine includes a steam turbine using steam and a gas turbine using a high temperature combustion gas.

Among them, the gas turbine is mainly composed of a compressor, a combustor, and a turbine. The compressor is provided with an air inlet for introducing air, and a plurality of compressor vanes and compressor blades, which are alternately arranged in a compressor housing.

The combustor supplies fuel to the compressed air compressed in the compressor and ignites a fuel-air mixture with a burner to produce a high temperature and high pressure combustion gas.

The turbine has a plurality of turbine vanes and turbine blades disposed alternately in a turbine casing. Further, a rotor is arranged to pass through the center of the compressor, the combustor, the turbine and an exhaust chamber.

Both ends of the rotor are rotatably supported by bearings. A plurality of disks is fixed to the rotor so that the respective blades are connected. A drive shaft such as a generator is connected to an end of the exhaust chamber.

Since these gas turbines have no reciprocating mechanism such as a piston found in a 4-stroke engine, and consequently have no frictional parts like piston-cylinder, they have several advantages. These include minimal consumption of lubricating oil, a significant reduction in amplitude, which is a characteristic of a reciprocating machine, and the ability to operate at high speed operation.

Briefly describing the operation of the gas turbine, the compressed air compressed in the compressor is mixed with fuel and combusted to produce a high-temperature combustion gas in the combustor, which is then injected toward the turbine. The injected combustion gas passes through the turbine vanes and the turbine blades to generate a rotational force, which causes the rotor to rotate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a tie rod-locking nut assembly capable of preventing a tie rod-locking nut from being loosened during operation of a gas turbine, and a gas turbine including the same.

In an aspect of the present disclosure, a tie rod-locking nut assembly includes: a tie rod-locking nut threaded onto a jack bolt; a jack bolt-locking nut inserted between the tie rod-locking nut and the jack bolt; an anti-loosening washer formed to wrap around an outer circumferential surface of the jack bolt-locking nut to prevent loosening of the jack bolt-locking nut; and a locking plate formed to cover the anti-loosening washer and engaging with an outer circumferential surface of the tie rod.

In some embodiments, the tie rod-locking nut may have a jack bolt-insertion hole formed at a position corresponding to a position in which the jack bolt is formed, and the jack bolt-insertion hole has a stepped portion formed at an end of the jack bolt-insertion hole.

In some embodiments, the jack bolt-locking nut has a shape of hollow pipe with both ends open and may be inserted into a gap formed between the stepped portion and the jack bolt during engagement with the jack bolt.

In some embodiments, the jack bolt-locking nut may be formed with a length greater than the stepped portion such that, when inserted into the gap, a distal end thereof is exposed externally from the tie rod-locking nut, wherein the jack bolt-locking nut is in a shape such that a cross-section of the jack bolt-locking nut has an outer circumference in a circular shape corresponding to the stepped portion and has an inner circumference in a polygonal shape corresponding to the jack bolt.

In some embodiments, a contact area between the jack bolt-locking nut and the anti-loosening washer may be caulked.

In some embodiments, the anti-loosening washer may be a circular plate member having a plurality of insertion holes formed in positions corresponding to the plurality of jack bolt-locking nuts.

In some embodiments, an inner circumferential surface of the locking plate may be threaded to engage with the outer circumferential surface of the tie rod.

In another aspect of the present disclosure, a gas turbine includes: a compressor suctioning and compressing external air and having a plurality of compressor rotor disks; a combustor mixing fuel with compressed air and combusting an air-fuel mixture; a turbine section having a plurality of turbine blades mounted on a plurality of turbine rotor disks so that the turbine blades is rotated by the combustion gases discharged from the combustor; and a tie rod having one end engaged with a most upstream-side one of the compressor rotor disks and the other end engaged with a tie rod-locking nut assembly, the tie rod-locking nut assembly including: a tie rod-locking nut threaded onto a jack bolt formed; a jack bolt-locking nut inserted between the tie rod-locking nut and the jack bolt; an anti-loosening washer formed to wrap around an outer circumferential surface of the jack bolt-locking nut to prevent loosening of the jack bolt-locking nut; and a locking plate formed to cover the anti-loosening washer and engaging with an outer circumferential surface of the tie rod.

In some embodiments, the tie rod-locking nut may have a jack bolt-insertion hole formed at a position corresponding to a position in which the jack bolt is formed, and the jack bolt-insertion hole has a stepped portion formed at an end of the jack bolt-insertion hole.

In some embodiments, the jack bolt-locking nut may have a shape of hollow pipe with both ends open and may be inserted into a gap formed between the stepped portion and the jack bolt during engagement with the jack bolt.

In some embodiments, the jack bolt-locking nut may be formed with a length greater than the stepped portion such that, when inserted into the gap, a distal end thereof is exposed externally from the tie rod-locking nut, wherein the jack bolt-locking nut is in a shape such that a cross-section of the jack bolt-locking nut has an outer circumference in a circular shape corresponding to the stepped portion and has an inner circumference in a polygonal shape corresponding to the jack bolt.

In some embodiments, a contact area between the jack bolt-locking nut and the anti-loosening washer may be caulked.

In some embodiments, the anti-loosening washer may be a circular plate member having a plurality of insertion holes formed in positions corresponding to the plurality of jack bolt-locking nuts.

In some embodiments, an inner circumferential surface of the locking plate may be threaded to engage with the outer circumferential surface of the tie rod.

Specific details of other implementations of various aspects of the present disclosure are included in the following detailed description.

According to embodiments of the present disclosure, it is possible to prevent the tie rod-locking nut from being loosened from the jack bolt due to vibration generated during operation of the gas turbine, thereby improving the operational stability of the gas turbine.

DETAILED DESCRIPTION

Figure 1:
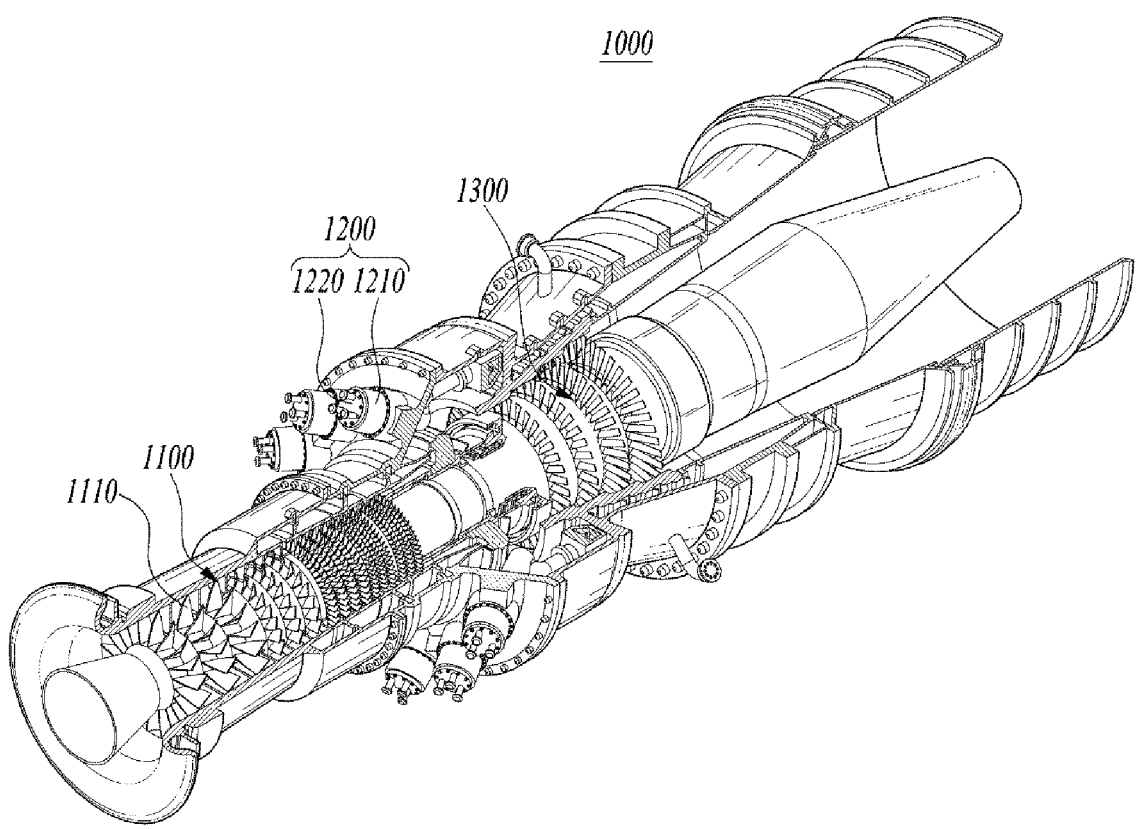
FIG. 1 is a partially cut-away perspective view of a gas turbine according to an embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
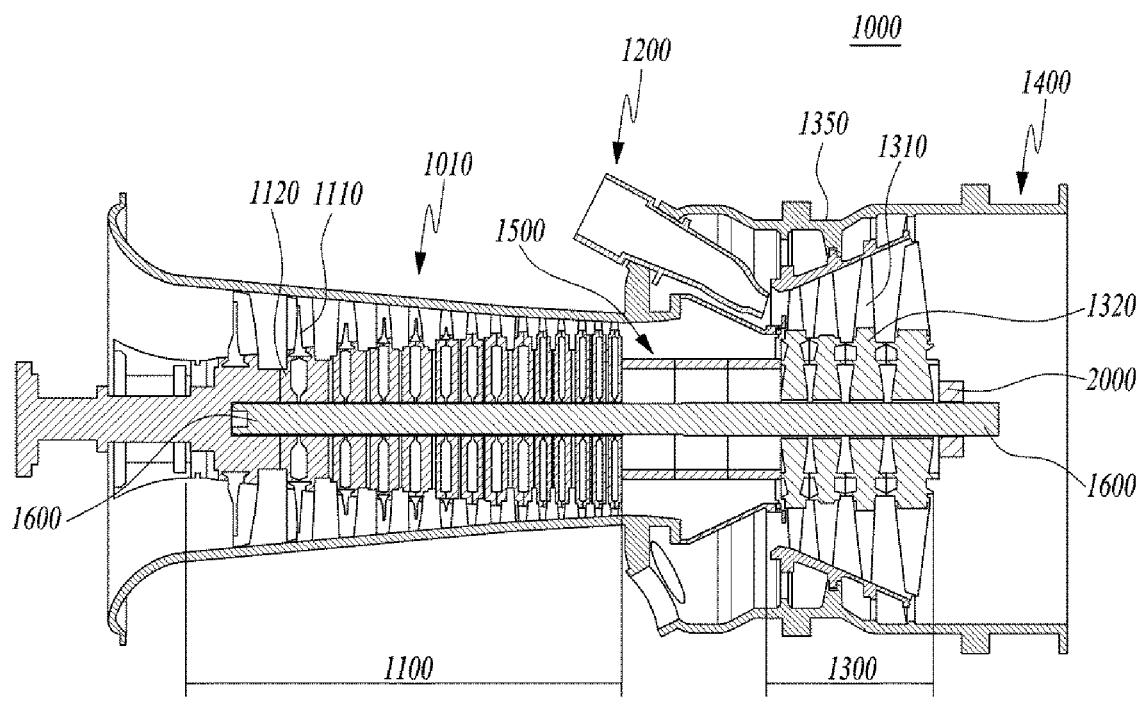
FIG. 2 is a cross-sectional view illustrating a schematic structure of a gas turbine according to an embodiment of the present disclosure.

FIG. 1 is a partially cut-away perspective view of a gas turbine according to an embodiment of the present disclosure, and FIG. 2 is a cross-sectional view illustrating a schematic structure of a gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of compressor blades 1110 radially installed. The compressor 1100 rotates the compressor blade 1110 so that air flows while being compressed by the rotation of the compressor blade 1110. The size and installation angle of the blade 1110 may vary depending on the installation location. In one embodiment, the compressor 1100 is compressed directly or indirectly to the turbine 1300, and receives a portion of the power generated from the turbine 1300 to rotate the compressor blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor section 1100 is located on the upstream side of the housing 1010, and a turbine section 1300 is located on the downstream side of the housing. A torque tube 1500 is disposed as a torque transmission member between the compressor section 1100 and the turbine section 1300 to transmit the rotational torque generated in the turbine section to the compressor section.

The compressor section 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of compressor blades 1110 are radially coupled to an outer circumferential surface of the compressor rotor disk 1120. Each of the compressor blades 1110 has a dovetail part 1112 which is fastened to the compressor rotor disk 1120.

Compressor vanes (not shown) fixed to the housing are respectively positioned between the rotor disks 1120. Unlike the compressor rotor disks, the compressor vanes are fixed to the housing and do not rotate. The compressor vane serves to align a flow of compressed air that has passed through the compressor blades 1110 of the compressor rotor disk 1120 and guide the air to the compressor blades 1110 of the rotor disk 1120 located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades to the rotor disk by using other fasteners such as keys or bolts in addition to the fastening shape.

The tie rod 1600 is arranged to pass through the center of the compressor rotor disks 1120 and turbine rotor disks 1320 such that one end thereof is engaged with the compressor rotor disk located on the most upstream side and the other end thereof is engaged with a tie rod-locking nut assembly 2000. The tie rod 1600 may be composed of a single tie rod or a plurality of tie rods. The tie rod-locking nut assembly 2000 according to the present disclosure will be described later with reference to FIGS. 5 to 10.

The shape of the tie rod 1600 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-pressure combustion gas. With an isobaric combustion process in the compressor, the temperature of the combustion gas is increased to the heat resistance limit that the combustor and the turbine components can withstand.

The combustor consists of a plurality of combustors, which is arranged in the housing formed in a cell shape, and includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The supplied high-temperature and high-pressure combustion gas expands and collides with the rotating blades of the turbine, generating a reaction force that imparts a rotational torque. This torque is subsequently transferred to the compressor via the torque tube 1500. Here, any surplus power needed to drive the compressor is used to drive a generator or similar equipment.

The turbine 1300 is basically similar in structure to the compressor. That is, the turbine 1300 is also provided with a plurality of turbine rotor disks 1320 similar to the compressor rotor disks of the compressor. Thus, the turbine rotor disk 1320 also includes a plurality of turbine blades 1310 disposed radially. The turbine blade 1310 may also be coupled to the turbine rotor disk 1320 in a dovetail coupling manner, for example. Between the turbine blades 1310, a turbine vane (not shown) fixed to a turbine casing 1350 is provided to guide a flow direction of the combustion gas passing through the turbine blades.

Figure 3A:
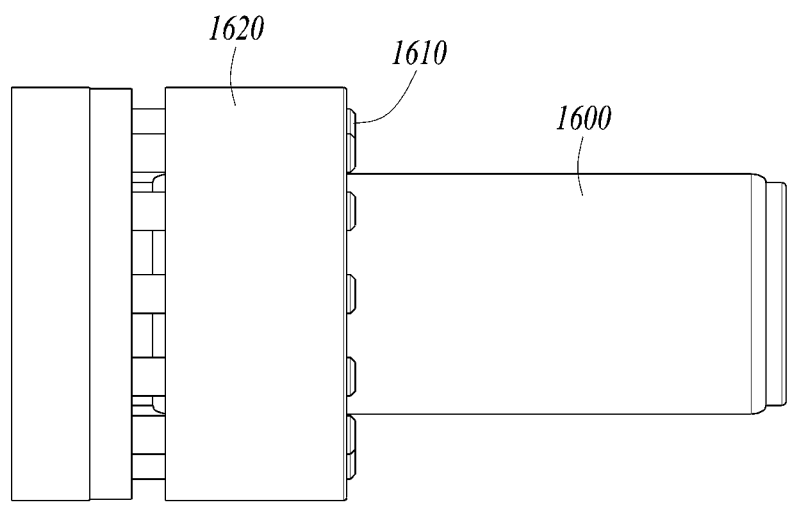
FIGS. 3A and 3B are views illustrating the process of assembling a tie rod-locking nut according to the related art.
Figure 3B:
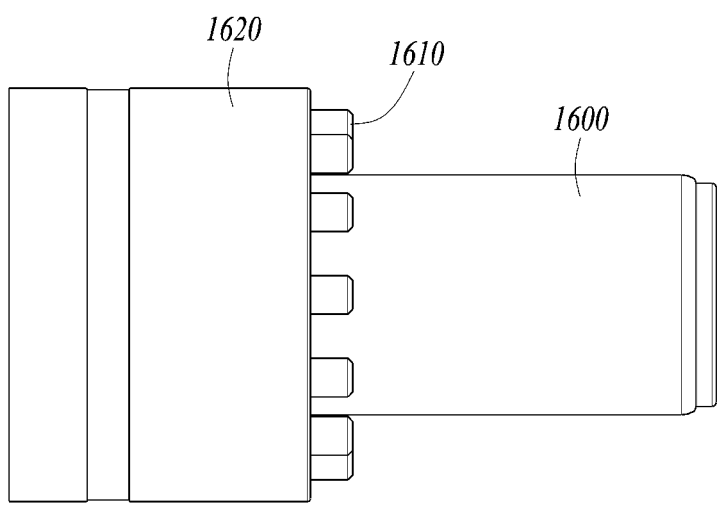
Figure 4:
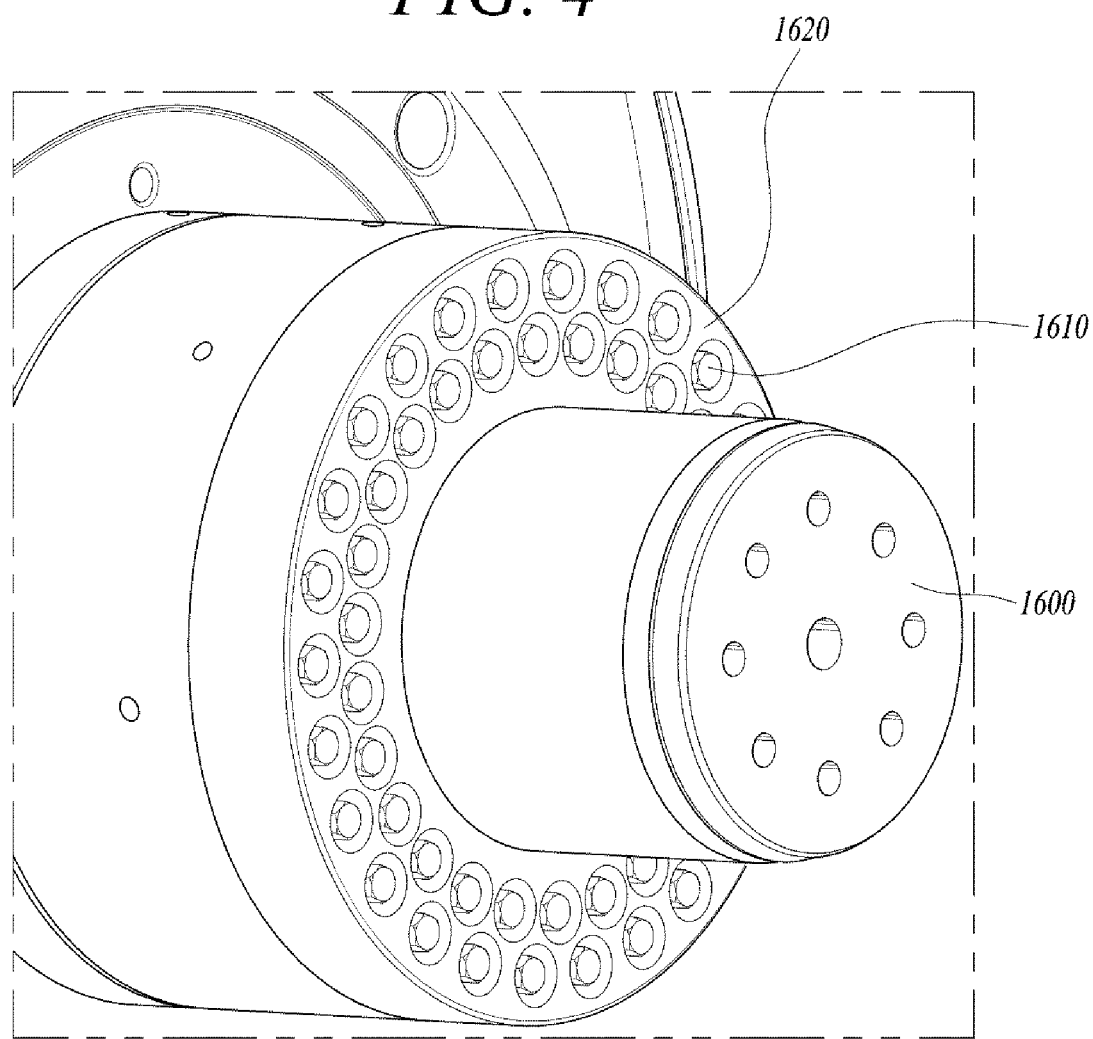
FIG. 4 is a perspective view illustrating a tie rod-locking nut assembled on a tie rod according to the related art.

FIGS. 3A and 3B are views illustrating the process of assembling a tie rod-locking nut according to the related art, and FIG. 4 is a perspective view illustrating a tie rod-locking nut assembled on a tie rod according to the related art.

Referring to FIGS. 3A, 3B, and 4, a jack bolt 1610 is formed at the other end of the tie rod 1600, and the tie rod-locking nut 1620 is threaded onto the jack bolt 1610. The tie rod-locking nut 1620 is able to provide a high tension force and tightening force to the tie rod 1600 as it is threaded onto the jack bolt 1610.

Large-scale gas turbines rotate at approximately 3600 RPM and are exposed to a variety of high-temperature/high-pressure environments. In particular, the tie rod-locking nut 1620 may be loosened from the jack bolt 1610 by vibrations generated during operation. However, conventional gas turbines are not equipped with means to prevent the tie rod-locking nut 1620 from being loosened. Accordingly, the present disclosure discloses a tie rod-locking nut assembly capable of preventing the tie rod-locking nut from being loosened during operation of the gas turbine, and a gas turbine including the tie rod-locking nut.

Figure 5:
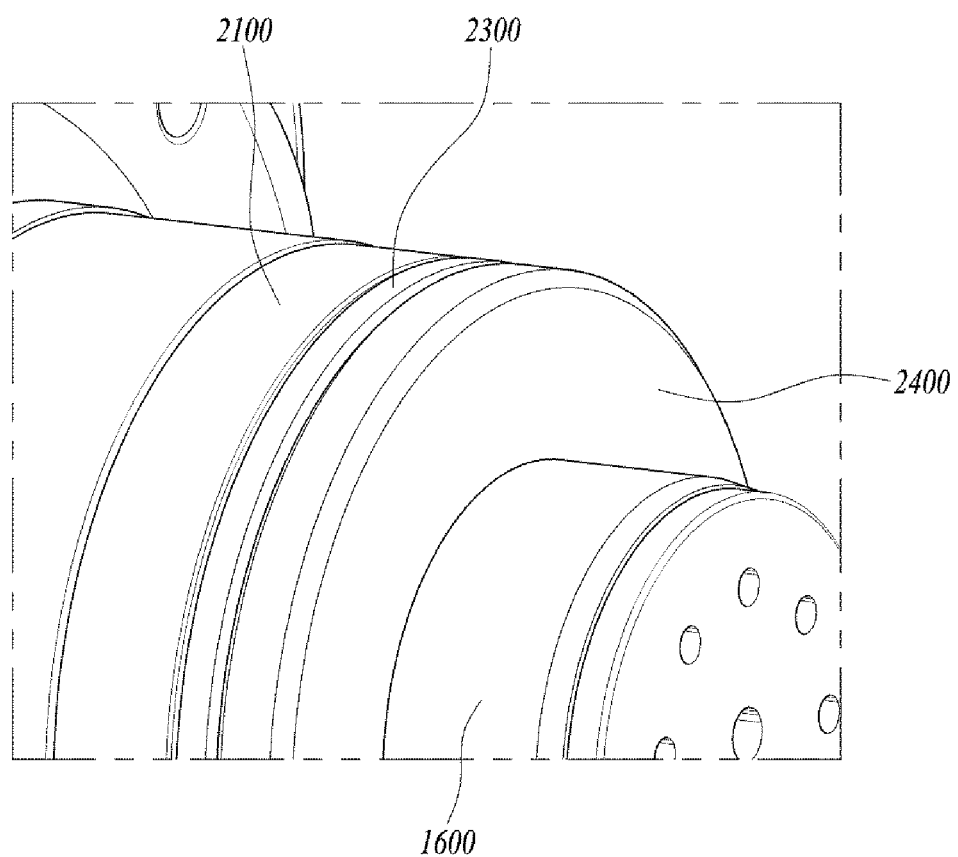
FIG. 5 is a perspective view illustrating a tie rod-locking nut assembly according to an embodiment of the present disclosure.
Figure 6:
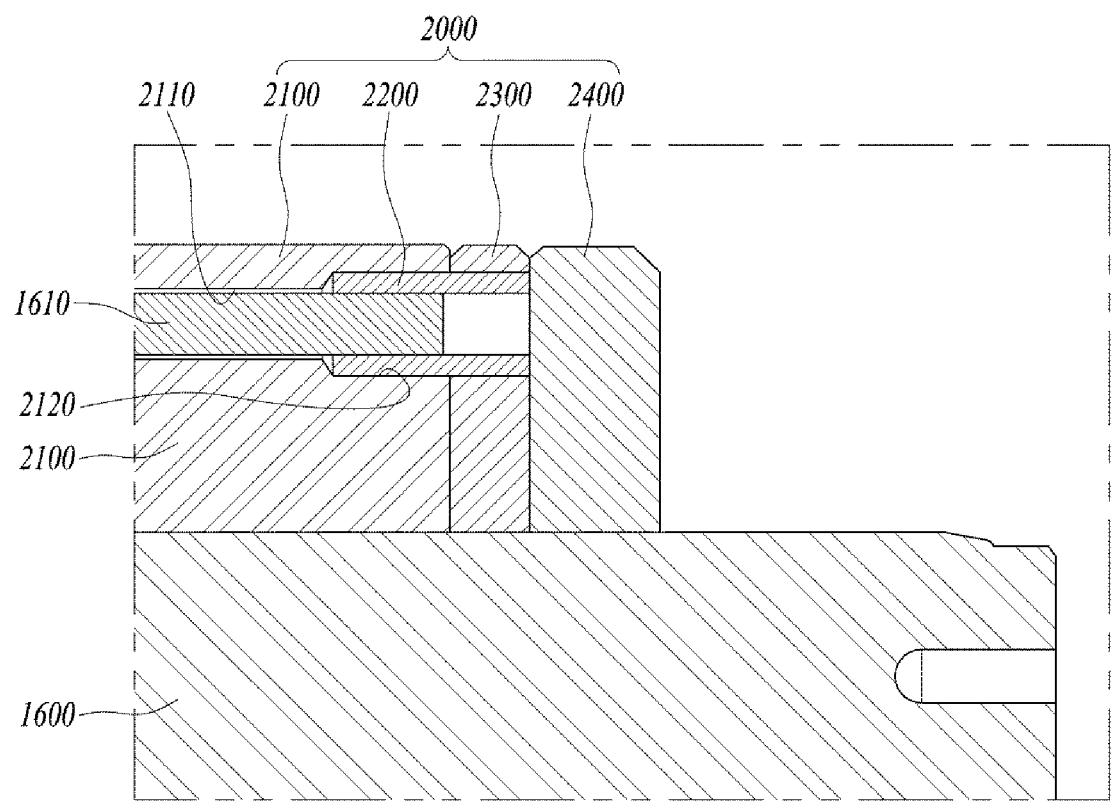
FIG. 6 is a cross-sectional view illustrating the tie rod-locking nut assembly according to the embodiment of the present disclosure.
Figure 7:
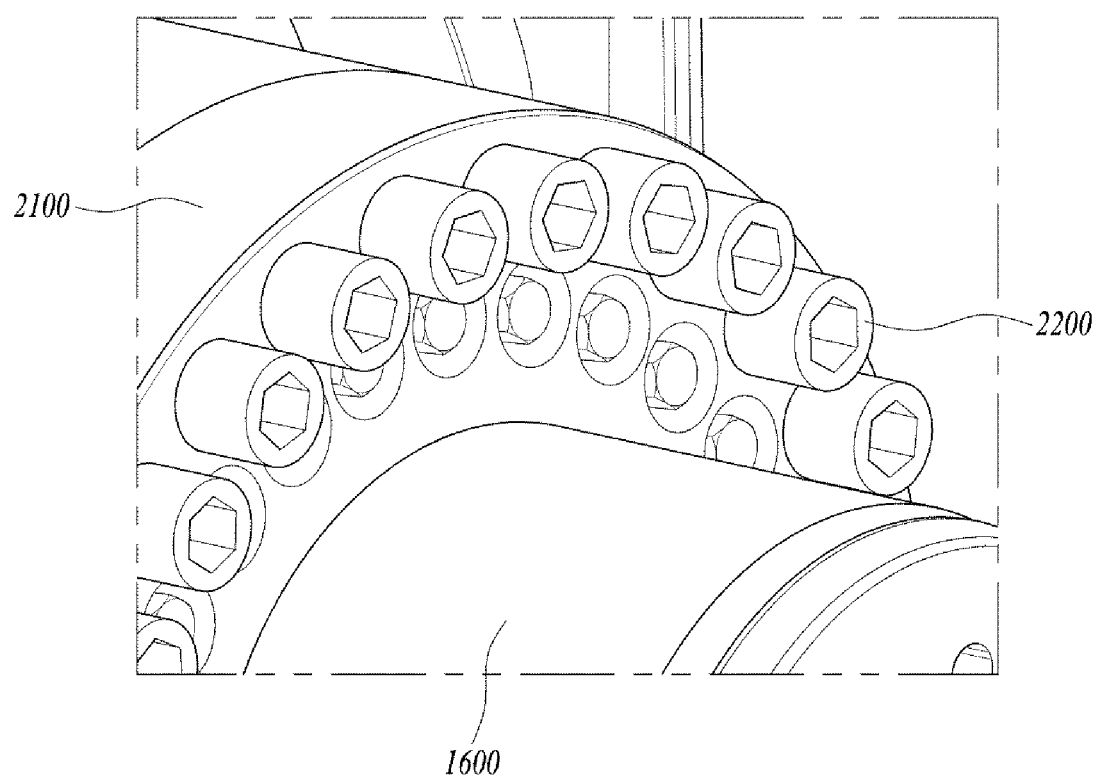
FIG. 7 is a perspective view illustrating a jack bolt-locking nut inserted between the tie rod-locking nut and the jack bolt.
Figure 8:
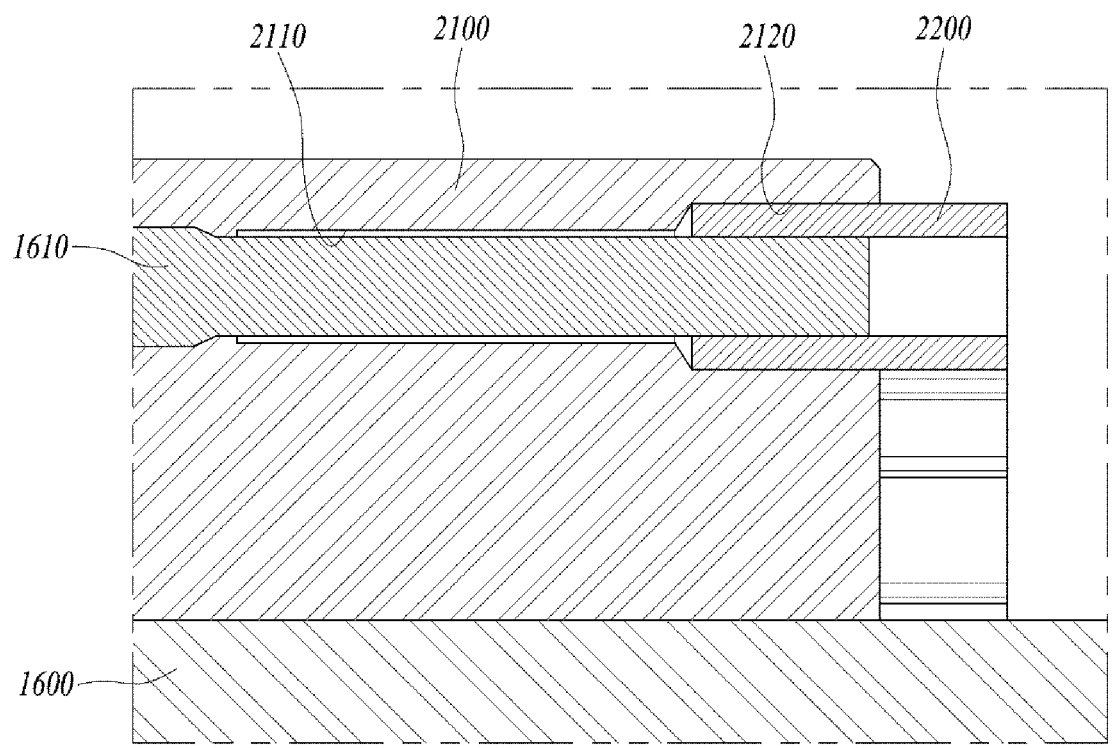
FIG. 8 is a cross-sectional view of FIG. 7.
Figure 9:
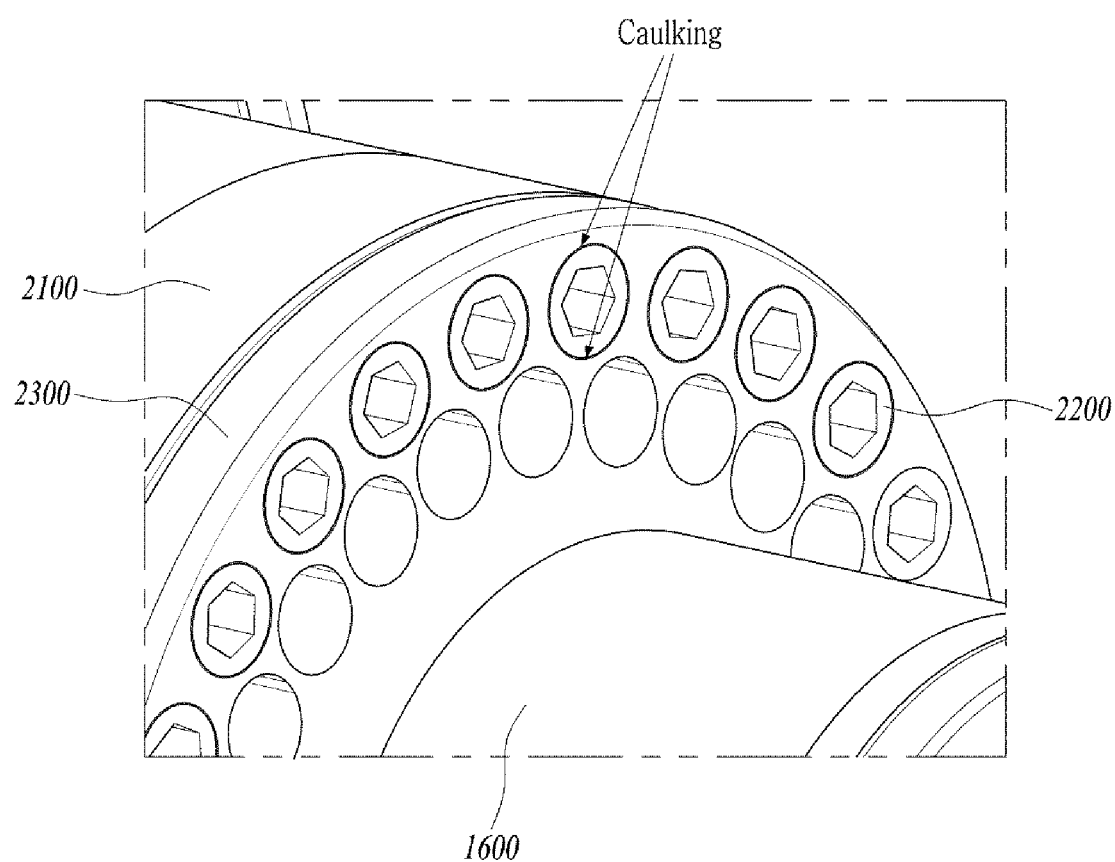
FIG. 9 is a perspective view illustrating the state of an anti-loosening washer being engaged in the configuration of FIG. 7.
Figure 10:
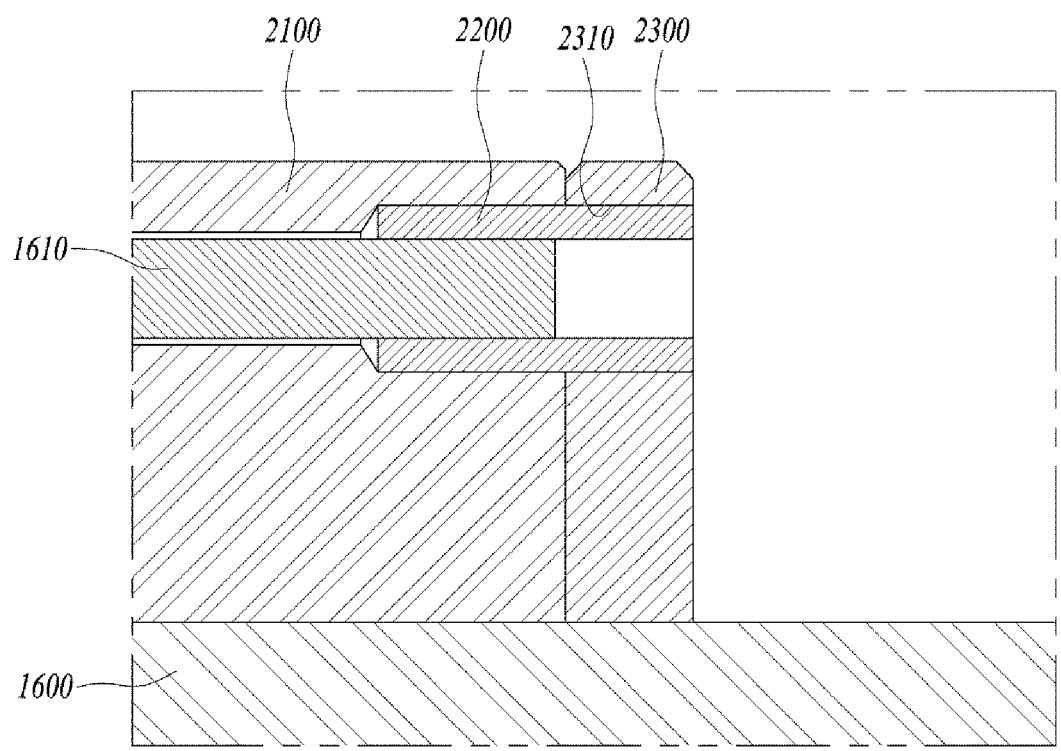
FIG. 10 is a cross-sectional view of FIG. 9.

FIG. 5 is a perspective view illustrating a tie rod-locking nut assembly according to an embodiment of the present disclosure, FIG. 6 is a cross-sectional view illustrating the tie rod-locking nut assembly according to the embodiment of the present disclosure, FIG. 7 is a perspective view illustrating a jack bolt-locking nut inserted between the tie rod-locking nut and the jack bolt, FIG. 8 is a cross-sectional view of FIG. 7, FIG. 9 is a perspective view illustrating the state of an anti-loosening washer being engaged in the configuration of FIG. 7, and FIG. 10 is a cross-sectional view of FIG. 9.

Referring to FIGS. 5 to 10, the tie rod-locking nut assembly 2000 includes a tie rod-locking nut 2100, a jack bolt-locking nut 2200, an anti-loosening washer 2300, and a locking plate 2400.

At an end of the tie rod 1600, a plurality of jack bolts 1610 are circularly arranged to form a circle around a central axis of the tie rod 1600. The circle formed by the plurality of jack bolts 1610 may be double concentric circles centered on the tie rod 1600. In other words, the plurality of jack bolts 1610 may be inserted in the rod-locking nut 2100 such that they form two concentric circles centered on the central axis of the tie rod 1600.

The direction in which the jack bolts 1610 are inserted in the rod-locking nut 2100 may be referred to as an upstream direction, which is parallel to the central axis of the tie rod 1600. The direction opposite to the upstream direction may be referred to as a downstream direction.

The tie rod-locking nut 2100 is threaded onto and engaged with the plurality of jack bolts 1610 formed at the end of the tie rod 1600. The tie rod-locking nut 2100 has a plurality of jack bolt-insertion holes 2110 formed at locations corresponding to the locations in which the plurality of jack bolts 1610 are formed. The plurality of jack bolt-insertion holes 2110 form a circle centered on the tie rod 1600, as in the plurality of jack bolts 1610. In other words, the plurality of jack bolt-insertion holes 2110 may be circularly arranged, being spaced apart from each other with regular intervals and having the tie rod 1600 at the center. According to an embodiment, the plurality of jack bolt-insertion holes 2110 may be arranged to form double concentric circles centered on the tie rod 1600.

According to an embodiment, each of the plurality of jack bolt-insertion holes 2110 may be in a cylindrical shape. The plurality of jack bolt-insertion holes 2110 may be formed by being grooved toward the upstream direction from a downstream end surface of the tie rod-locking nut 2100. Each of the plurality of jack bolt-insertion holes 2110 may be in a cylindrical shape having an inner circumferential surface. A stepped portion 2120 is formed at a downstream end of the jack bolt-insertion holes 2110. When a diameter of the jack bolt-insertion hole 2110 measured at upstream is defined as a first diameter, and a diameter of the jack bolt-insertion hole 2110 measured at the stepped portion 210 is defined as a second diameter, the second diameter is larger than the first diameter. The first and second diameters may be constant. In other words, the cylindrical shape of the jack bolt-insertion hole 2110 includes a front part at relatively upstream and an end part at relatively downstream formed by the stepped portion 210, while the front part and the end part are concentric, the end part has a larger diameter than the front part.

When the jack bolt 1610 is inserted into the jack bolt-insertion hole 2110, the jack bolt 1610 is engaged with the thread formed on the inner surface of the first part of the jack bolt-insertion hole 2110 and there is formed a space between the jack bolt 1610 and the end part of the jack bolt-insertion hole 2110 (i.e., a space between the jack bolt 1610 and the stepped portion 2120).

A jack bolt-locking nut 2200 is formed to have a shape of hollow pipe with both ends open, and is inserted between the tie rod-locking nut 2100 and the jack bolt 1610, in other words, the jack bolt-locking nut 2200 is inserted in the space between the jack bolt 1610 and the end part of the tie rod-locking nut 2110. When the jack bolt-locking nut 2200 engages with the jack bolt 1610, the jack bolt-locking nut may be inserted into a gap formed between the jack bolt 1610 and the stepped portion 2120 formed at the end of the jack bolt-insertion hole 2110. The cross-section of the jack bolt-locking nut 2200 may be in a shape such that the outer circumference is a circular shape corresponding to the stepped portion 2120 of the jack bolt-insertion hole 2110 and the inner circumference may be a polygonal shape corresponding to jack bolt 1610. The jack bolt-locking nut 2200 may be formed with a length greater than the stepped portion 2120, such that when inserted into the gap, an downstream end of the jack bolt-locking nut 2200 may be exposed externally from the tie rod-locking nut 2100. In other words, when inserted into the gap, a downstream end of the jack bolt-locking nut 2200 may be exposed by protruding further downstream than the downstream end surface of the tie rod-locking nut 2100.

The anti-loosening washer 2300 is formed to wrap around an outer circumferential surface of the jack bolt-locking nut 2200, especially the protruding portions of the jack bolt-locking nut 2200. The anti-loosening washer 2300 is in close contact with the tie rod-locking nut 2100. The area in which the jack bolt-locking nut 2200 and the anti-loosening washer 2300 contact may be caulked to prevent rotation of the jack bolt-locking nut 2200, thereby preventing the jack bolt-locking nut 2200 from being loosened. The anti-loosening washer 2300 is a circular plate member or a disk-shaped plate member having a plurality of insertion holes 2310 formed in positions corresponding to the plurality of jack bolt-locking nuts 2200. The diameter and the location of the insertion holes 2310 formed in the anti-loosening washer 2300 may be the same as the diameter and the location of the stepped portions 2120 of the plurality of jack bolt-insertion holes in the tie rod-locking nut 2100. The thickness, in other words, an axial length of the anti-loosening washer 2300 may be the same with the length of the protruding portions of the jack bolt-locking nut 2200. The inner diameters of the insertion holes 2310 are formed to be sized to allow the jack bolt-locking nuts 2200 to be inserted. The plurality of insertion holes 2310 are arranged to form a circle centered on the tie rod 1600 as in the plurality of jack bolts 1610. According to an embodiment, the plurality of insertion holes 2310 may be arranged to form double centric circles centered on the tie rod 1600. A through-hole is formed at the center of the anti-loosening washer 2300 such that the tie rod 1600 is threaded therethrough. The outer diameter of the anti-loosening washer 2300 may be the same with the outer diameter of the tie rod-locking nut 2100.

The locking plate 2400 is formed and arranged to cover the jack bolt-locking nut 2200 and the anti-loosening washer 2300 at their downstream ends. The locking plate 2400 is formed in the same shape as the anti-loosening washer 2300 except that the locking plate 2400 does not have insertion holes 2310 and that the locking plate 2400 may be thicker than the anti-loosening washer 2300 (i.e., longer axial length). That is, the locking plate 2400 is a circular plate member or a disk-shaped plate member of the same size (i.e., same outer diameters) as the anti-loosening washer 2300, and has a through-hole formed at the center such that the tie rod 1600 passes therethrough. A thread is formed on an inner circumferential surface of the locking plate 2400 to engage with the outer circumferential surface of the tie rod 1600.

According to embodiments of the present disclosure, it is possible to prevent the tie rod-locking nut from being loosened from the jack bolt due to vibration generated during operation of the gas turbine, thereby improving the operational stability of the gas turbine.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

The invention claimed is:

1. A tie rod-locking nut assembly comprising:
a tie rod-locking nut threaded onto a jack bolt;
a jack bolt-locking nut inserted between the tie rod-locking nut and the jack bolt;
an anti-loosening washer formed to wrap around an outer circumferential surface of the jack bolt-locking nut to prevent loosening of the jack bolt-locking nut; and
a locking plate formed to cover the anti-loosening washer and engaging with an outer circumferential surface of a tie rod.

2. The tie rod-locking nut assembly of claim 1, wherein the tie rod-locking nut has a jack bolt-insertion hole formed at a position corresponding to a position in which the jack bolt is formed, and the jack bolt-insertion hole has a stepped portion formed at an end of the jack bolt-insertion hole.

3. The tie rod-locking nut assembly of claim 2, wherein the jack bolt-locking nut has a shape of hollow pipe with both ends open and is inserted into a gap formed between the stepped portion and the jack bolt during engagement with the jack bolt.

4. The tie rod-locking nut assembly of claim 3, wherein the jack bolt-locking nut is formed with a length greater than the stepped portion such that, when inserted into the gap, a distal end thereof is exposed externally from the tie rod-locking nut,
wherein the jack bolt-locking nut is in a shape such that a cross-section of the jack bolt-locking nut has an outer circumference in a circular shape corresponding to the stepped portion and has an inner circumference in a polygonal shape corresponding to the jack bolt.

5. The tie rod-locking nut assembly of claim 1, wherein a contact area between the jack bolt-locking nut and the anti-loosening washer is caulked.

6. The tie rod-locking nut assembly of claim 1, where the jack bolt-locking nut is one of a plurality of jack bolt-locking nuts and wherein the anti-loosening washer is a circular plate member having a plurality of insertion holes formed in positions corresponding to the plurality of jack bolt-locking nuts.

7. The tie rod-locking nut assembly of claim 1, wherein an inner circumferential surface of the locking plate is threaded to engage with the outer circumferential surface of the tie rod.

8. A tie rod and tie rod-locking nut assembly, the tie rod arranged to pass through a center of a plurality of compressor rotor disks and turbine rotor disks and having one end engaged with a most upstream-side one of the compressor rotor disks and the other end engaged with the tie rod-locking nut assembly, the tie rod-locking nut assembly comprising:
a tie rod-locking nut threaded onto a jack bolt;
a jack bolt-locking nut inserted between the tie rod-locking nut and the jack bolt;
an anti-loosening washer formed to wrap around an outer circumferential surface of the jack bolt-locking nut to prevent loosening of the jack bolt-locking nut; and
a locking plate formed to cover the anti-loosening washer and engaging with an outer circumferential surface of the tie rod.

9. The tie rod of claim 8, wherein the tie rod-locking nut has a jack bolt-insertion hole formed at a position corresponding to a position in which the jack bolt is formed, and the jack bolt-insertion hole has a stepped portion formed at an end of the jack bolt-insertion hole.

10. The tie rod of claim 9, wherein the jack bolt-locking nut has a shape of hollow pipe with both ends open and is inserted into a gap formed between the stepped portion formed and the jack bolt during engagement with the jack bolt.

11. The tie rod of claim 10, wherein the jack bolt-locking nut is formed with a length greater than the stepped portion such that, when inserted into the gap, a distal end thereof is exposed externally from the tie rod-locking nut,
wherein the jack bolt-locking nut is in a shape such that a cross-section of the jack bolt-locking nut has an outer circumference in a circular shape corresponding to the stepped portion and has an inner circumference in a polygonal shape corresponding to the jack bolt.

12. The tie rod of claim 8, wherein a contact area between the jack bolt-locking nut and the anti-loosening washer is caulked.

13. The tie rod of claim 8, where the jack bold-locking nut is one of a plurality of jack bolt-locking nuts and wherein the anti-loosening washer is a circular plate member having a plurality of insertion holes formed in positions corresponding to the plurality of jack bolt-locking nuts.

14. The tie rod of claim 8, wherein an inner circumferential surface of the locking plate is threaded to engage with the outer circumferential surface of the tie rod.

15. A gas turbine comprising:
a compressor suctioning and compressing external air and having a plurality of compressor rotor disks;
a combustor mixing fuel with compressed air and combusting an air-fuel mixture;
a turbine section having a plurality of turbine blades mounted on a plurality of turbine rotor disks so that the turbine blades is rotated by the combustion gases discharged from the combustor; and
a tie rod having one end engaged with a most upstream-side one of the compressor rotor disks and the other end engaged with a tie rod-locking nut assembly, the tie rod-locking nut assembly comprising:
a tie rod-locking nut threaded onto a jack bolt;
a jack bolt-locking nut inserted between the tie rod-locking nut and the jack bolt;
an anti-loosening washer formed to wrap around an outer circumferential surface of the jack bolt-locking nut to prevent loosening of the jack bolt-locking nut; and
a locking plate formed to cover the anti-loosening washer and engaging with an outer circumferential surface of the tie rod.

16. The gas turbine of claim 15, wherein the tie rod-locking nut has a jack bolt-insertion hole formed at a position corresponding to a position in which the jack bolt is formed, and the jack bolt-insertion hole has a stepped portion formed at an end of the jack bolt-insertion hole.

17. The gas turbine of claim 16, wherein the jack bolt-locking nut has a shape of hollow pipe with both ends open and is inserted into a gap formed between the stepped portion formed and the jack bolt during engagement with the jack bolt.

18. The gas turbine of claim 17, wherein the jack bolt-locking nut is formed with a length greater than the stepped portion such that, when inserted into the gap, a distal end thereof is exposed externally from the tie rod-locking nut,
wherein the jack bolt-locking nut is in a shape such that a cross-section of the jack bolt-locking nut has an outer circumference in a circular shape corresponding to the stepped portion and has an inner circumference in a polygonal shape corresponding to the jack bolt.

19. The gas turbine of claim 15, where the jack bolt-locking nut is one of a plurality of jack bolt-locking nuts and wherein the anti-loosening washer is a circular plate member having a plurality of insertion holes formed in positions corresponding to the plurality of jack bolt-locking nuts.

20. The gas turbine of claim 15, wherein an inner circumferential surface of the locking plate is threaded to engage with the outer circumferential surface of the tie rod.

* * * * *